(12) United States Patent
Kavimani Nagar et al.

(10) Patent No.: US 9,334,384 B2
(45) Date of Patent: May 10, 2016

(54) ELASTOMERIC MATERIALS AND USE THEREOF

(71) Applicant: LEIBNIZ-INSTITUT FUER POLYMERFORSCHUNG DRESDEN E.V., Dresden (DE)

(72) Inventors: Prabhu Kavimani Nagar, Dresden (DE); René Jurk, Schwarzheide (DE); Klaus Werner Stoeckelhuber, Freiberg (DE); Amit Das, Dresden (DE); Andreas Leuteritz, Dresden (DE); Gert Heinrich, Hannover (DE); Basudam Adhikari, Kharagpur (IN)

(73) Assignee: LEIBNIZ-INSTITUT FUER POLYMERFORSCHUNG DRESDEN E.V., Dresden (DE)

( * ) Notice: Subject to any disclaimer, the term of this patent is extended or adjusted under 35 U.S.C. 154(b) by 0 days.

(21) Appl. No.: 14/415,075

(22) PCT Filed: Jul. 9, 2013

(86) PCT No.: PCT/EP2013/064465
§ 371 (c)(1),
(2) Date: Jan. 15, 2015

(87) PCT Pub. No.: WO2014/012819
PCT Pub. Date: Jan. 23, 2014

(65) Prior Publication Data
US 2015/0175768 A1    Jun. 25, 2015

(30) Foreign Application Priority Data
Jul. 16, 2012   (DE) .......................... 10 2012 212 422

(51) Int. Cl.
| C08K 5/34 | (2006.01) |
| C08K 3/00 | (2006.01) |
| C08K 3/04 | (2006.01) |
| B60C 1/00 | (2006.01) |
| C08K 5/3445 | (2006.01) |

(52) U.S. Cl.
CPC ................. *C08K 3/04* (2013.01); *B60C 1/0008* (2013.04); *C08K 5/3445* (2013.01); *C08K 2201/008* (2013.01)

(58) Field of Classification Search
CPC ........................................................ C08K 3/04
USPC ........................................................ 524/106
See application file for complete search history.

(56) References Cited

U.S. PATENT DOCUMENTS

| 6,548,585 B1 | 4/2003 | Ozawa et al. |
| 7,572,855 B2 | 8/2009 | Fudemoto et al. |
| 2005/0215693 A1* | 9/2005 | Wang ...................... C01B 33/44 524/445 |
| 2006/0173115 A1 | 8/2006 | Fudemoto et al. |
| 2006/0229404 A1 | 10/2006 | Lechtenboehmer |
| 2010/0036023 A1 | 2/2010 | Weng et al. |
| 2010/0096597 A1* | 4/2010 | Prud'Homme ........ B82Y 30/00 252/511 |
| 2012/0171103 A1* | 7/2012 | Zhao ...................... B82Y 10/00 423/415.1 |

FOREIGN PATENT DOCUMENTS

| DE | 102 43 181 A1 | 1/2004 |
| DE | 10 2009 044 345 A1 | 5/2011 |
| EP | 2489697 | 8/2012 |
| WO | WO 2010/016976 A1 | 2/2010 |
| WO | WO 2011/045944 A1 | 4/2011 |
| WO | WO 2012/170412 A2 | 12/2012 |

OTHER PUBLICATIONS

"Graphit," German Wikipedia, pp. 1-6.
Kenneth R. Seddon, "Ionic Liquids for Clean Technology," J. Chem. Tech. Biotechnol., Aug. 5, 1996, pp. 351-356.

* cited by examiner

*Primary Examiner* — Hui Chin
(74) *Attorney, Agent, or Firm* — Greenblum & Bernstein, P.L.C.

(57) ABSTRACT

The invention is concerned with the field of polymer chemistry and relates to elastomeric materials as usable, for example, as an inner liner material for motor vehicle tires, and to the use thereof. The problem addressed by the present invention consists in specifying elastomeric materials having relatively low gas permeability. The problem is solved by elastomeric materials comprising butyl and/or halobutyl rubbers or mixtures thereof, with 1 to 20 phr of at least one liquid imidazolium salt and with 1 to 40 phr of at least one filler having a graphitic structure. The problem is additionally solved by the use of the inventive elastomeric materials for elastomer materials having low to very low gas permeability.

8 Claims, No Drawings

ELASTOMERIC MATERIALS AND USE THEREOF

CROSS-REFERENCE TO RELATED APPLICATIONS

The present application is a U.S. National Stage of International Patent Application No. PCT/EP2013/064465 filed Jul. 9, 2013, and claims priority under 35 U.S.C. §§119(a) and 365 of German Patent Application No. 10 2012 212 422.5 filed Jul. 16, 2012. Moreover, the disclosure of International Patent Application No. PCT/EP2013/064465 is expressly incorporated by reference herein in its entirety.

BACKGROUND OF THE INVENTION

1. Field of the Invention

The invention is concerned with the field of polymer chemistry and relates to elastomeric materials as are usable, for example, as an inner liner material for vehicle tires, and to the use thereof.

2. Discussion of Background Information

Modern vehicle tires are constructed from a number of components. The main component of the vehicle tire is what is referred to as the carcass, which is composed of a running band and of a fabric substructure acting as a stability support. On the inside of the carcass, an elastomeric layer referred to as an inner liner layer or inner liner is applied which is used to enclose as well as possible the tire gas introduced in tubeless vehicle tires, so that the tire gas enclosed between the rim and tire is, to the greatest possible extent, not able to diffuse to the outside through the material of the vehicle tire and can only do so very gradually. A lowest possible gas permeability of the inner liner is therefore desirable, particularly also because a decrease in pressure in the tire has a negative effect on both the rolling friction of the tire, and the increased fuel consumption associated therewith, and also on the driving safety and the durability of the tire. In addition, the inner liner is used to protect other tire components, such as the carcass and steel belt, against air and moisture.

As elastomer materials for inner liners, synthetic rubbers such as butyl rubber (IIR), chlorobutyl rubber (CIIR) or bromobutyl rubber (BIIR) are used which already exhibit low gas permeability. In some cases, these butyl rubbers are used blended with other diene rubbers in order to achieve an improvement of the mechanical properties or a cost reduction, for example. Furthermore, the gas permeability of the material can also be improved by blending filler particles into the rubber matrix. Particularly the admixture of lamellar particles, such as layered silicates or graphenes, for example, reduces the gas permeability of the material as a result of a lengthening of the diffusion path of the gas molecules (tortuosity).

According to US 2006/0229404, a method for producing an elastomer blend is known in which, from an elastomer with expanded graphite, diene monomers are polymerized in the presence of 10 phr or more (parts per 100 parts rubber) of expandable graphite, so that the elastomer is intercalated into the graphite.

Also, a rubber composition for the production of inner tubes in refrigerant hoses is known from U.S. Pat. No. 6,548,585. The rubber composition is made from a brominated copolymer rubber, which can be poly[isobutylene-co-p-methylstyrene] (BIMSM), for example, and an inorganic lamellar filler, which can be graphite, zirconium phosphate, chalcogenides, talc, kaolinite, bentonite, montmorillonite, mica or chlorite, for example.

According to US 2010/0036023, elastomer materials made of graphitic nanoparticles, which are preferably graphene nanoparticles, are known. Elastomer materials of this type are used as inner liners in tire tubes.

Furthermore, from US 2005/0215693, a method is known by means of which the vulcanization properties of layered silicate/rubber systems are to be improved. In this method, the layered silicate is exfoliated by the addition of an ionic liquid and subsequently added to the rubber blend. The surfactant ionic liquid compatibilizes the layered silicate with the rubber and reduces the gas permeability thereof with no significant negative effect on the vulcanization properties.

An ionic liquid is generally understood as meaning a liquid which is composed exclusively of ions. Unlike the conventional term "molten salts," which normally denotes a highly viscous and usually very corrosive medium with a high melting point, ionic liquids are already liquid at low temperatures (<100° C.) and have relatively low viscosity (DE 102 43 181 A1). Although ionic liquids have already been known since 1914, they were only studied intensively as a solvent and/or catalyst in organic systems in the last 10 years (overview article by K. R. Seddon in J. Chem. Technol. Biotechnol. 68 (1997), 351-356).

From U.S. Pat. No. 7,572,855 B2, a nanocomposite is also known which contains a cationic compatibilizer. The cationic compatibilizer is composed of a hydrophobic group and a heterocyclic cationic unit. In the case of rubber materials and tire materials, this nanocomposite can be used to achieve improved gas permeability, improved vulcanization properties and/or improved mechanical properties.

SUMMARY OF THE EMBODIMENTS

The object of the present invention is the specification of elastomeric materials which have lower gas permeability.

The object is attained by the invention disclosed in the claims. Advantageous embodiments are the subject matter of the dependent claims.

The elastomeric materials according to the invention contain butyl rubbers and/or halobutyl rubbers or mixtures thereof, with 1 to 20 phr of at least one liquid imidazolium salt and with 1 to 40 phr of at least one filler having a graphitic structure.

Also advantageously, butyl-3-methylimidazolium bis(trifluoromethylsulfonyl)imides, more advantageously 1-butyl-3-methylimidazolium bis(trifluoromethylsulfonyl)imides, are present as liquid imidazolium salts.

Also advantageously, 1 to 5 phr of liquid imidazolium salts is present in the elastomeric materials.

Likewise advantageously, 1 to 20 phr of fillers having a graphitic structure is present in the elastomeric materials.

It is also advantageous if, as a filler having a graphitic structure, graphene is present.

According to the invention, the elastomeric materials are used for elastomer materials with low to very low gas permeability.

Advantageously, the elastomeric materials are used as an inner liner for vehicle tires.

DETAILED DESCRIPTION OF THE EMBODIMENTS

With the solution according to the invention, it is possible for the first time to specify elastomeric materials which have a significantly lower gas permeability than other elastomeric materials according to the prior art.

This is essentially attained in that, in addition to butyl rubbers and/or halobutyl rubbers or mixtures thereof, the elastomeric materials also comprise 1 to 20 phr of at least one liquid imidazolium salt and 1 to 40 phr of at least one filler having a graphitic structure, in particular, graphene.

A blending of lamellar fillers into elastomer materials normally reduces the gas permeability thereof by lengthening the transport path of the gas molecules (tortuosity) in the rubber matrix. Here, it is essential, however, that the individual filler platelets must be very well dispersed in the rubber matrix in order to reduce the gas permeability. As is known, graphene has a strong tendency to agglomerate, so that the use thereof in elastomer materials results in a significant increase in the gas permeability of the elastomer material.

According to the invention, this disadvantage can be eliminated and a good to very good dispersion of the filler particles in the elastomeric material can be achieved by the addition and presence of at least one liquid imidazolium salt in the elastomer material together with the filler having a graphitic structure. As a result, the transport paths or diffusion paths of the gas molecules are thus once again significantly lengthened, and the gas permeability is therefore further decreased.

It has thereby also proven essential to the invention that only an addition of the liquid imidazolium salts and fillers in the amount specified according to the invention achieves the improved dispersion. Smaller or larger additions of liquid imidazolium salts and fillers having a graphitic structure then again lead to agglomerations of the filler particles and increased gas permeability.

The liquid imidazolium salts also interact with the surfaces of the filler particles and thus result in a modification of the surfaces, which in turn leads to a compatibilization of the filler with the elastomer material and to a significantly improved dispersion of the filler particles.

With the solution according to the invention, the gas permeability of, for example, vehicle tires which comprise an inner liner layer made of the elastomeric materials according to the invention can be significantly reduced. This can also result in the ability to reduce the layer thickness of this inner liner layer and thus save material and weight.

The invention is explained below in greater detail with the aid of an exemplary embodiment.

Example 1

A rubber blend with the composition according to Table 1 was produced by mixing all the components together.

TABLE 1

| Component | phr |
|---|---|
| Bromobutyl rubber (BIIR) (Lanxess Bromobutyl X2) | 100 |
| Magnesium oxide (MgO) | 0.5 |
| Graphene nanoplatelets (GnP) (XGScience xGnP-M-5) | 15 |
| 1-Allyl-3-methylimidazolium chloride (AMIC) liquid imidazolium salt (LI) | 10 |
| Stearic acid | 1 |
| Paraffin oil | 5 |
| Sulfur (S) | 0.5 |

TABLE 1-continued

| Component | phr |
|---|---|
| Zinc oxide (ZnO) | 3 |
| Dibenzothiazole disulfide (MBTS) | 1.5 |

Through studies using Raman spectroscopy, it was possible, after the vulcanization of the elastomeric materials, to demonstrate an interaction between the liquid imidazolium salt and the surface of the graphene nanoplatelets in which it was possible to establish a significant shift of the G bands in a GnP-LI mixture as compared to the pure GnP.

Table 2 shows the results of a gas permeation measurement (GDP-C gas permeability tester, Brugger Feinmechanik GmbH, Munich) which was conducted on an elastomer material according to Table 1 without graphene and liquid imidazolium salts (prior art) and with different contents of graphene (GnP) and liquid imidazolium salt (LI).

TABLE 2

| | Composition | Gas transmission rate (GTR) [$cm^3/m^2/day$] |
|---|---|---|
| BIIR-0 | Pure bromobutyl rubber | 22 |
| BIIR-5GnP-5LI | Bromobutyl rubber with 5 phr GnP and 5 phr LI | 5.32 |
| BIIR-20GnP-5LI | Bromobutyl rubber with 20 phr GnP and 5 phr LI | 3.88 |

It was possible to establish that, with the use of liquid imidazolium salts, an interaction with the graphene surfaces could be achieved whereby the graphene surfaces are modified. This leads to an improved compatibilization of the graphene with the elastomer and to a significantly improved deagglomeration and dispersion of the graphene particles. The improved dispersion of the graphene particles results in a markedly increased diffusion path of the gas molecules during the permeation thereof through the elastomer material.

The invention claimed is:

1. Elastomeric material, containing butyl rubber and/or halobutyl rubber or mixture thereof, with 1 to 20 phr of at least one liquid imidazolium salt and with 1 to 40 phr of at least one filler having a graphitic structure.

2. Elastomeric material according to claim 1 in which butyl-3-methylimidazolium bis(trifluoromethylsulfonyl)imide are present as liquid imidazolium salt.

3. Elastomeric material according to claim 1 in which 1 to 5 phr of liquid imidazolium salt is present.

4. Elastomeric material according to claim 1 in which 1 to 20 phr of filler having a graphitic structure is present.

5. Elastomeric material according to claim 1 in which, as a filler having a graphitic structure, graphene is present.

6. Elastomeric material according to claim 1, wherein the gas permeability of the elastomeric materials is no more than 5.32 $cm^3/m^2/day$.

7. A vehicle tire having an inner liner comprising the elastomeric material according to claim 6.

8. Elastomeric material according to claim 2, wherein the butyl-3-methylimidazolium bis(trifluoromethylsulfonyl)imide is 1-butyl-3-methylimidazolium bis(trifluoromethylsulfonyl)imide.

\* \* \* \* \*